United States Patent [19]

Schüler

[11] Patent Number: 5,718,477
[45] Date of Patent: Feb. 17, 1998

[54] RAIL PAIR FOR MOTOR VEHICLE SEATS

[75] Inventor: Rolf Schüler, Heiligenhaus, Germany

[73] Assignee: Keiper Recaro GmbH & Co., Remscheid, Germany

[21] Appl. No.: 629,968

[22] Filed: Apr. 9, 1996

[30] Foreign Application Priority Data

Apr. 11, 1995 [DE] Germany ............ 195 13 707.8

[51] Int. Cl.$^6$ .................................................. B60N 2/00
[52] U.S. Cl. ............................................................. 297/341
[58] Field of Search .................... 297/341, 344.1, 297/340, 378.1; 248/429, 424

[56] References Cited

U.S. PATENT DOCUMENTS

| | | |
|---|---|---|
| 4,463,922 | 8/1984 | Rees . |
| 4,742,983 | 5/1988 | Nihei ............................. 297/341 X |
| 4,881,774 | 11/1989 | Bradley et al. . |
| 4,881,827 | 11/1989 | Borlinghaus et al. . |
| 4,909,570 | 3/1990 | Matsuhashi ................... 297/341 |
| 4,973,104 | 11/1990 | Nakayama et al. ............. 297/341 |
| 5,020,853 | 6/1991 | Babbs . |
| 5,352,019 | 10/1994 | Bauer et al. . |

FOREIGN PATENT DOCUMENTS

| | | |
|---|---|---|
| 32 11857 A1 | 10/1983 | Germany . |
| 37 10476 A1 | 10/1987 | Germany . |

*Primary Examiner*—Milton Nelson, Jr.
*Attorney, Agent, or Firm*—Wigman, Cohen, Leitner & Myers, P.C.

[57] ABSTRACT

In a rail pair for motor vehicle seats, with a lower rail (7) that is to be connected to the vehicle and with an upper rail (2) that is to be connected with the seat and that, in a prestressed state, is supported via guide elements so that it can be shifted longitudinally in lower rail (7) and that is connected in a form-locking manner with lower rail (7) laterally with respect to the longitudinal direction of the rails, there is provided at least one bracing element (11) that is arranged on one of the two rails (2, 7) so that it can be moved only in the lateral direction with respect to the rails and that the other rail (7) can be pressed on with adjustable or preset force.

9 Claims, 3 Drawing Sheets

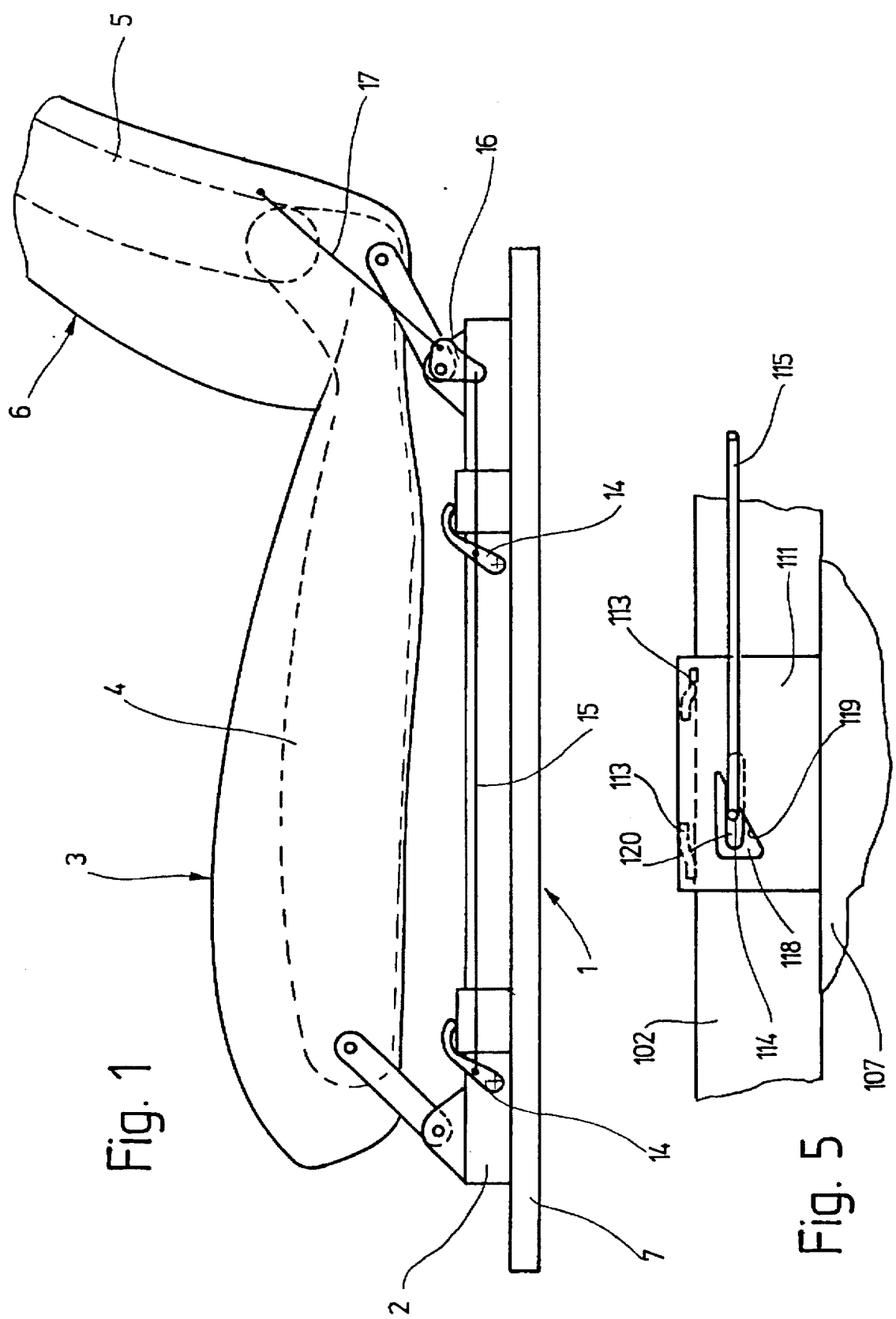

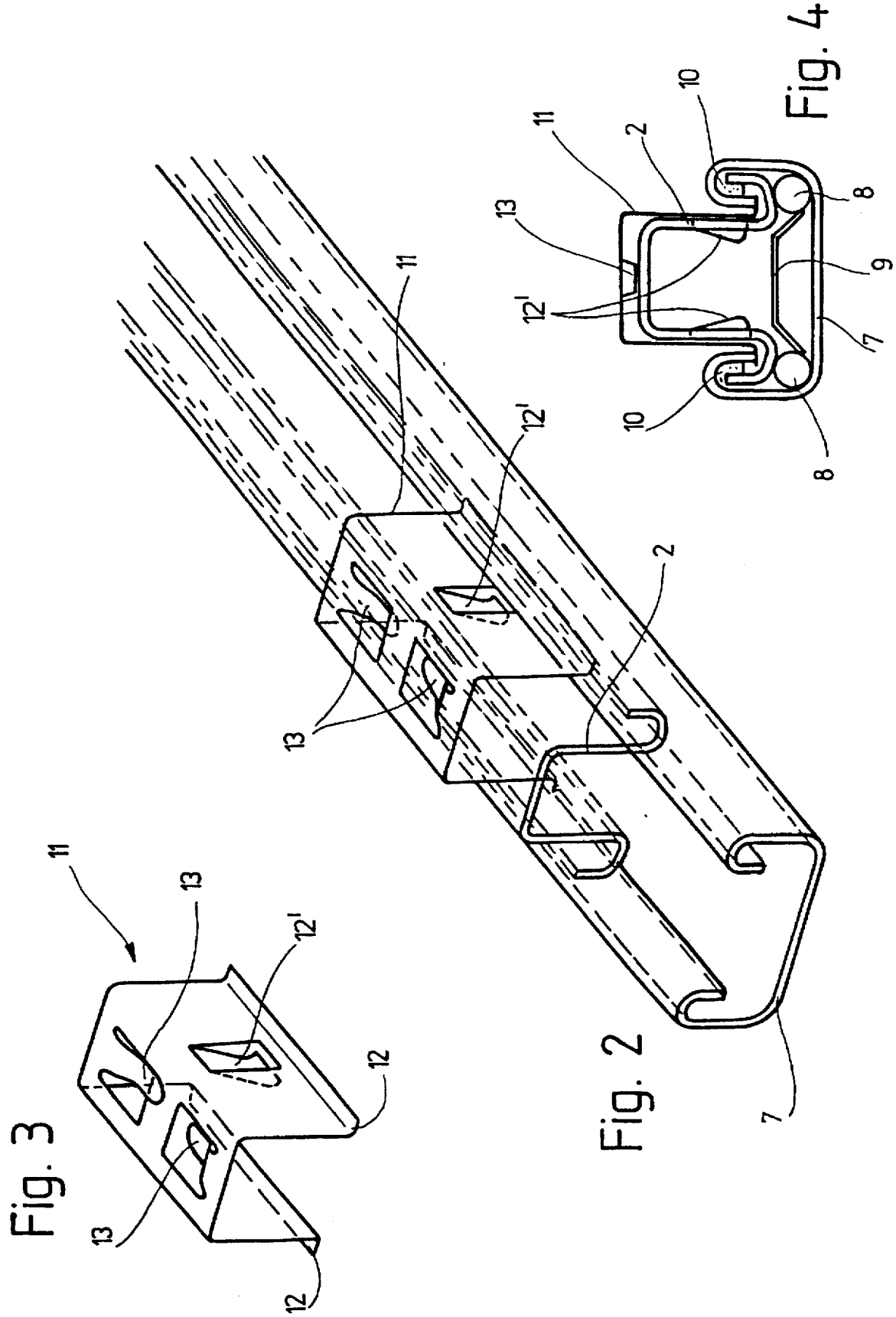

5,718,477

RAIL PAIR FOR MOTOR VEHICLE SEATS

BACKGROUND OF THE INVENTION

This invention relates generally to a rail pair for motor vehicle seats.

Rails of the aforementioned type are intended to connect the seat in a form-locking manner in the lateral direction with respect to the rails—although movable in the longitudinal direction of the rails—with the vehicle floor group. The upper rail is guided without play in the lower rail so that there can be no rattling noises, especially when there is no weight on the seat. This is achieved by bracing both rails in a certain way, as a result of which the force required to move the seat in the longitudinal direction of the rails is also increased. This force increase is desirable with respect to the normal seat length adjustment. However, when a seat is pushed forward, its back rest is snapped forward, in the case of seats for two-door vehicles, to facilitate access to the rear seats, the bracing, which is done to attain zero backlash, is a source of disturbance because a minimal shifting force is demanded for this case of longitudinal shifting. The tolerances of the rails, the vehicle floor group, and the seat structure however cause considerable differences in rail bracing during assembly. The bracing as a rule is made larger than necessary to ensure the required zero backlash.

SUMMARY OF THE INVENTION

An object of the present invention is to provide a rail pair of the aforementioned kind which can better meet the rail bracing requirements than the known rail pairs.

The bracing element according to the invention causes the bracing of both rails or that at least contributes to it and can equalize the tolerance-conditioned deviations of the bracing from the desired required value. Thus, the bracing element of the present invention can be designed to change the bracing force, or, can be selected, among predetermined bracing elements, to yield the desired bracing value. If the bracing force is changeable, an actuation element is provided to alter the effect of the bracing element. In this way, two different settings of the bracing force is provided. One setting ensures the shifting force desired for normal longitudinal adjustment plus zero backlash. For the other setting, the bracing force of the bracing element can be reduced down to zero. In this manner, minimum friction and the smallest possible shifting force together with a folding motion of the back rest for a longitudinal shift is achieved.

The bracing element of the present invention is made as a friction body in a preferred embodiment. This body needs to be lifted completely off the other rail only by means of the actuation element so as to rendered it ineffective.

The bracing element's bracing force is generated preferably with the help of at least one prestressed spring because such a spring causes only a minor effort.

In a preferred embodiment, the actuation element, associated with the bracing element, is controlled from the back rest and/or a snap lock associated with it so that the bracing element can be rendered ineffective automatically if the seat is to be shifted in connection with a folding motion of the back rest.

To make the design very simple and to save space, there is provided a bracing element in the form of a clamp grasping over the upper rail from above; the side ends of the clamp grasp under one, each, material portion of the lower rail. A prestressed spring may be placed between the crib segment of this clamp and the upper rail; when the clamp is made of a piece of spring steel, that spring can involve one or several spring tongues made integral with the clamp; this spring or these springs are bent out of the crib segment of the clamp toward the upper rail. To rendered such a friction body ineffective, one only needs to press its crib segment against the force of the spring toward the topside of the upper rail, for example, by means of an actuation lever. But one may also provide, for example, in the cribs of the clamp, one, each, connecting link, for example, in the form of an inclined plane that cooperates with a pin which can be moved in a longitudinal guide of the upper rail and that serves as actuation member.

Actuation of a clamp-shaped bracing element is advantageous also in that one provides a spindle-like actuation member that is guided in a corresponding guide in the crib part of the upper rail and that, in case of a rotation movement, for example, by means of a rocking lever, pulls the crib segment of the clamp against the force of the prestressed spring or springs toward the crib part of the upper rail and, in the process, lifts the clamp off the material portions of the lower rail that had been grasped from behind.

BRIEF DESCRIPTION OF THE DRAWINGS

The invention will be explained in detail below with the help of embodiments illustrated in the drawing, wherein:

FIG. 1 is a elevational side view of a first embodiment in conjunction with a vehicle seat;

FIG. 2 is an incomplete perspective view of the embodiment according to FIG. 1, without the pertinent actuation levers;

FIG. 3 is a perspective view of the friction body;

FIG. 4 is a front view of the rail pair and one of the two pertinent friction bodies;

FIG. 5 is a side elevational view (fragmentary) of a second embodiment;

DETAILED DESCRIPTION OF THE PREFERRED EMBODIMENT

Figure 8:
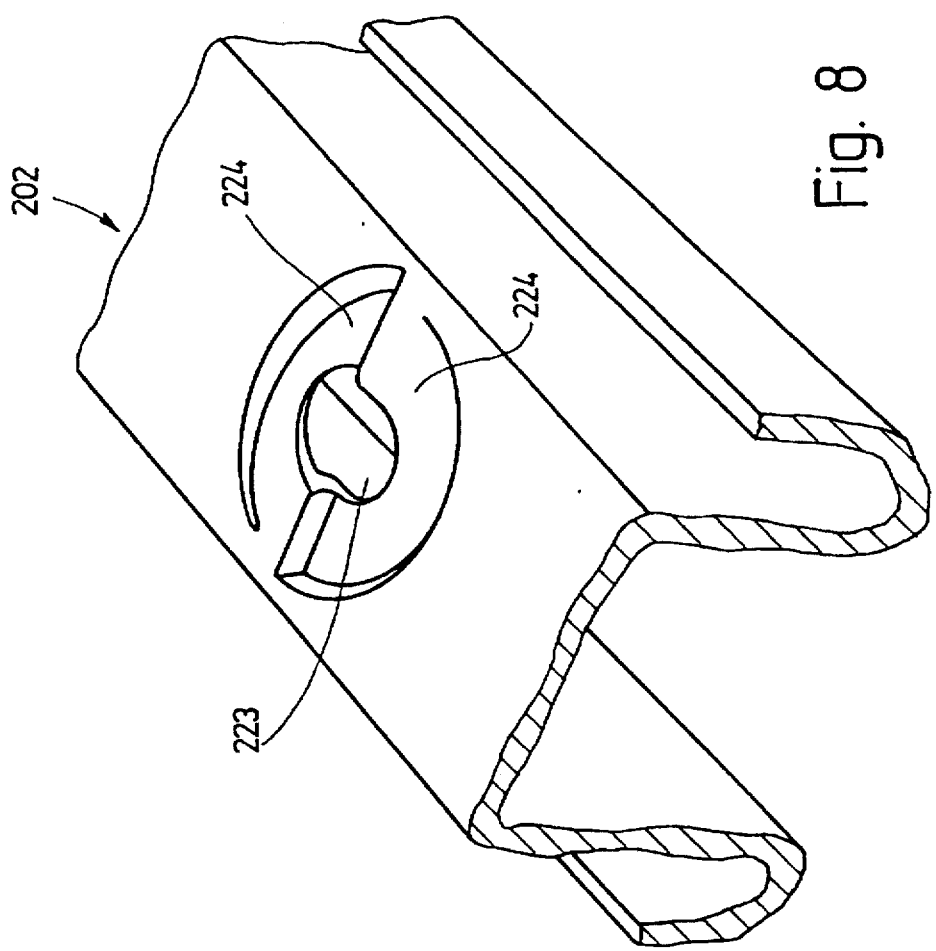
FIG. 8 is a perspective view of the segment of the upper rail in the third embodiment.

Referring now to the drawings wherein like numerals indicate like elements throughout the several views, in FIG. 1, there is shown an identical pair of shaped rails 1.

A motor vehicle seat, is connected to the floor of the vehicle by means of the shaped rail pairs 1. Seat part 3 is connected to the upper rail 2 of both rail pairs 1 by means of supporting structure 4. Laterally arranged joint mountings, of which only one is shown in the form of a diagram in FIG. 1, is connected to the supporting structure 5 of a back rest 6. These two joint mountings permit not only the adjustment of the inclination position of the back rest but also a folding motion forward, upon release of a folding lock.

As this folding lock is released, one of the rail locking devices—that is associated with the two rail pairs 1 and that is made in the known fashion and that is therefore not illustrated—is released so that not only back rest 6 will snap forward but so that seat part 3 can also be pushed forward. The seat can be used again only after seat part 3 has been returned to the starting position and after it has been locked in that position and once the folding lock of back rest 6 is closed again.

Upper rail 2 of both rail pairs 1, as shown in FIGS. 2 and 4, has the shape of an isosceles clamp, that is, open downward and with side ends that are bent outward and upward to form a groove that is open toward the top. The pertinent lower rail 7 has the shape of a parallel-sided clamp that is open upward and with side ends that are bent inward and downward and which engage one or the other upward-open groove of the upper rail. As shown in FIG. 4, the segments of upper rail 2—that are bent downward and outward—are braced on lower rail 7 via balls 8. Spacers 9 hold the balls 8 in the two channels that are formed at the transition from the base of lower rail 7 to its sides. Elastic sliding elements 10 are arranged between the upward-pointing terminal segment of both sides of upper rail 2 and the terminal segments of lower rail 7 that grasp over them.

Each of upper rail 2 has a friction body 11, in its forward and rear terminal segments. The identically shaped friction bodies 11 are made from spring steel and are in the form of a parallel-sided clamp. Friction bodies 11, as shown in FIGS. 2 and 4, grasp upper rail 2 from above. Tongues 12' are cut out of the sides and bent inward to engage corresponding slits (or slots) (not shown) are provided in each slit to secure each friction body 11 against being shifted with relation to upper rail 2 in the latter's longitudinal direction, without impairing a shift in the longitudinal direction of tongues 12' and the slots receiving them. Additional, tongues and slots can be provided on the sides at the crib parts of the friction body or the upper rail. There is little play between the sides of friction body 11 and those of upper rail 2 to prevent friction. The free terminal segments 12 of both legs of the friction body are bent down and outward and, as shown in FIG. 4, grasp under the two terminal segments of lower rail 7 that point downward and in which engage the grooves formed by upper rail 2. Two spring tongues 3 which are cut out of the crib segment of friction body 11 are bent down toward the crib part of upper rail 2 and are supported on said pan. By the force of these two prestressed spring tongues 13, the free terminal segments 12 of friction body 11 are pressed against the side ends of lower rail 7 as a result of which—together with the prestressing force of sliding element 10—upper rail 2 is so prestressed with respect to lower rail 7 that upper rail 2 will be connected to lower rail 7 without play even when there is no weight on the seat and will have the value desired for the shifting force that is required for the longitudinal adjustment of the seat.

As shown in FIG. 1, associated with each friction body 11, which are connected in a vertically movable direction but which, in all other directions, are immovably connected with the associated upper rail 2, is a friction lever 14 that is linked to upper rail 2 with a swing axis running in the lateral direction with respect to the seat. The two actuation levers 14, that are coupled to the same upper rail 2, are connected, at an interval from their anchor point, with a traction element 15, for example, a cable or a rod, whose rear end is connected with one arm of a rocking lever 16 which, in turn, is connected to upper rail 2 and can be swung around an axis running laterally with respect to the seat. A second traction element 17 extends from the other arm of rocking lever 16 to the folding lock of back rest 6 or to the latter's supporting structure 5.

Even if back rest 6 cannot be folded forward, friction body 11 can be provided to attain the desired prestressing value in case of large tolerances. In this case, for example, traction element 15 can be connected with an adjusting device and one can thus give friction bodies 11 the desired prestressing together or one can associate one adjusting device with each of friction bodies 11, as a result of which each friction body 11 can be prestressed independently of the others.

Once the locking device of the back rest 6 has been released, but at the latest, when back rest 6 is folded forward, rectangular lever 16 is swung over traction element 17 as a result of which traction element 15 swings the two actuation levers 14 in the clockwise direction, looking in the direction indicated in FIG. 1, whereupon the terminal segment—resting on top of the crib segment of the associated friction body 11, between the latter's two spring tongues 13—is moved toward upper rail 2 and thus, against the force of spring tongues 13, presses the associated friction body 11 downward. As a result, the free terminal segments 12 of friction body 11 are lifted off the side ends of lower rail 7. That reduces the friction between upper rail 2 and lower rail 7 to such an extent that only a very small shifting force is necessary to push seat part 3, together with the two upper rails 2, in the two lower rails 7, forward and then again to the rear.

The figures do not illustrate the rail locking device that normally locks upper rails 2 in a form-locking manner, in the longitudinal direction of the rails, together with lower rails 7; but this locking device is released when the folding lock of the back rest is released.

The embodiment according to FIG. 5 differs from the one according to FIGS. 1 to 4 by virtue of a different actuation of friction bodies 111, as more fully explained hereinafter.

In the two sides of the identically shaped friction body 111, recess 118 is provided on each side directed downward, in other words, toward lower rail 107. Recess 118 limited by a steering curve 119 in the form of an inclined plane that rises toward the rear. In the segment of upper rail 102—over which grasps friction body 111—there is provided, in each of the two sides of said upper rail 102, longitudinal guide 120 in the form of a slit (or slot) extending along the longitudinal direction of the rails. The slit crosses the steering curve in the immediately neighboring side of friction body 111. In the two associated longitudinal guides 120, pin 114 acts as actuation member and, as shown in FIG. 5, also rests against steering curve 119.

As in the case of the exemplary embodiment according to FIGS. 1 to 4, a traction element 115 connects the pins of the two friction bodies 111, that are arranged at an interval behind each other, to the rectangular lever that is not illustrated and that, in turn, is controlled by the folding lock of the back rest or by the latter itself. A movement of traction element 115 to the right, looking in the direction indicated in FIG. 5, in other words, toward the rear, causes friction bodies 111 to be moved downward, against the force of their spring tongues 113, as a result of which each friction body 111 is lifted off lower rail 107.

Figure 6:
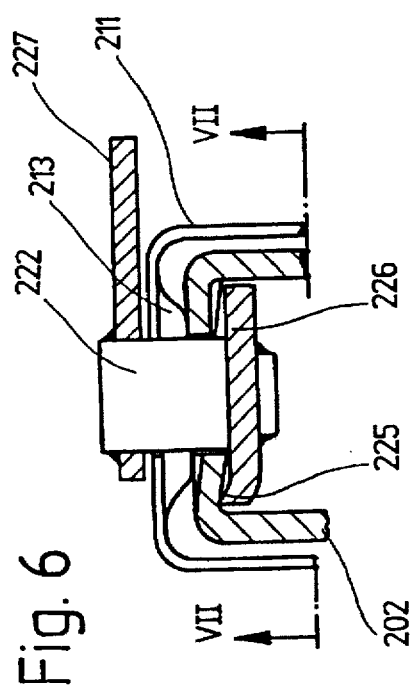
FIG. 6 is an incomplete profile of a third embodiment.
Figure 7:
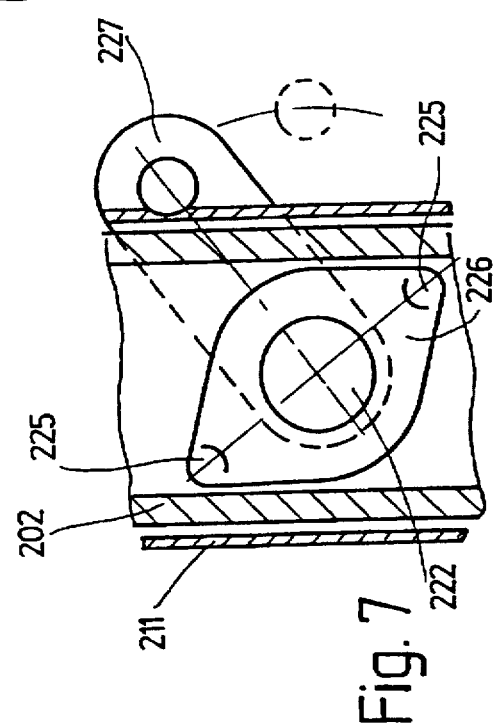
FIG. 7 is a profile along VII—VII of the embodiment in FIG. 6.

The third exemplary embodiment, illustrated in FIGS. 6 to 8, also differs from the two previously-described exemplary embodiments only by virtue of the fact that the friction bodies 211 are actuated in a different manner. Thus, reference is made to the description regarding the first exemplary embodiment with respect to the other details.

The crib segment of the identically fashioned, clamp-shaped friction body 211, between the two spring tongues 213, has a central passage opening for a stud 222 that is rotatably positioned in a round hole 223 that penetrates the crib part of upper rail 202 in the middle and that was made by way of a punching procedure in the exemplary embodiment. Two spiral surfaces 224 are formed concentrically with respect to round hole 223 during this punching procedure. Against the underside of these spiral surfaces 224 rest two caps 225 of a diamond-shaped stop plate 226 that is firmly connected with the lower end of stud 222. Firmly connected with the upper end of stud 222 is a radially projecting steering lever 227 that protrudes laterally over upper rail 202 and that normally is at a short distance above the crib segment of friction body 211.

When the locking device of the back rest is released, so that it may be snapped forward, each one of steering levers 227 is swung, by means of an actuation rod that is not shown and that runs laterally, next to upper rail 202. Specifically, it is swung in the direction of observation according to FIG. 7, in a clockwise direction. This swinging motion turns the associated stop plate 226. Since cups 225 rest against spiral surfaces 224, the associated stud 222 is not only rotated but is also moved downward. As a result of this downward motion, steering lever 227 is first brought to rest against friction body 211. Subsequently, it is moved against the force of its spring tongues 213 sufficiently to releases the lower rail.

The seat can now be moved forward with a small shifting force. Steering lever 227 of each friction body 211 again resumes the swinging position shown in FIGS. 6 and 7 only after it has returned to the starting position and after the back rest has been folded back again. In that swinging position, friction body 211 is pressed against the lower rail with maximum force.

Although certain presently preferred embodiments of the present invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed:

1. Rail pair for a motor vehicle seat having a lower rail to be connected with the vehicle and with an upper rail that is to be connected to the seat, comprising:

at least one bracing element arranged on one of the two rails so that it can be moved only in a vertical direction relative to the rails and that can be pressed against the other rail with a press-on force selected from the group of forces consisting of adjustable force and preset force, including an actuation element with means for adjusting the press-on force of said bracing element, such that said actuation element is controlled by an element selected from the group of elements consisting of a back rest and a back rest folding lock.

2. Rail pair according to claim 1, wherein said bracing element is a friction body, said actuation element operatively connected to said friction body so that the friction body can be lifted off the other rail.

3. Rail pair according to claim 2, further including at least one prestressed spring that stresses said bracing element against the other rail.

4. Rail pair according to claim 3, wherein said bracing element is a clamp that engages said upper rail from above, said bracing element including side ends that are operatively connected to said lower rail; and a spring positioned adjacent the upper rail.

5. Rail pair according to claim 4, wherein said spring is tongue-shaped and bent down toward said upper rail.

6. Rail pair according to claim 4, wherein said actuation element, is a rocking lever, said rocking lever being coupled to said upper rail, such that, when in an actuated state, it presses the clamp down from above.

7. Rail pair according to claim 6, wherein said actuation element is connected to a force transmission element, said force transmission element extends in the longitudinal direction of each rail and is moveable along the longitudinal direction of each rail by a folding motion of an element selected from the group of elements consisting of a back rest and a back rest lock as the latter element is opened and closed.

8. Rail pair for a motor vehicle seat having a lower rail to be connected with the vehicle and with an upper rail that is to be connected to the seat, comprising:

at least one bracing element in the form of a friction body arranged on the upper rail and moveable in a vertical direction relative to the rails, said friction body pressed against the lower rail with a press-on force selected from the group of forces consisting of adjustable force and preset force, including an actuation element with means for adjusting the press-on force of said bracing element, such that said actuation element is controlled by an element selected from the group of elements consisting of a back rest and a back rest folding lock.

9. Rail pair as in claim 8, wherein said friction body includes tongue-shaped springs for engaging slots in said upper rail.

* * * * *